US 6,750,454 B2

(12) United States Patent
Brown et al.

(10) Patent No.: US 6,750,454 B2
(45) Date of Patent: Jun. 15, 2004

(54) AUTOMATED ANALYSIS OF TURBINE COMPONENT THERMAL RESPONSE

(75) Inventors: William T. Brown, West Linn, OR (US); Brian A. Dalio, Lake Oswego, OR (US)

(73) Assignee: Computerized Thermal Imaging, Inc., Ogden, UT (US)

( * ) Notice: Subject to any disclaimer, the term of this patent is extended or adjusted under 35 U.S.C. 154(b) by 278 days.

(21) Appl. No.: 10/006,436

(22) Filed: Nov. 21, 2001

(65) Prior Publication Data

US 2003/0100987 A1 May 29, 2003

(51) Int. Cl.[7] .............................................. G01N 21/71
(52) U.S. Cl. ................................................... 250/341.6
(58) Field of Search ......................... 250/341.6; 374/5; 382/141; 702/135, 82

(56) References Cited

U.S. PATENT DOCUMENTS

| 4,644,162 | A  |   | 2/1987  | Bantel et al.            |
| 4,983,836 | A  | * | 1/1991  | Matoba et al. ... 250/330 |
| 5,111,046 | A  |   | 5/1992  | Bantel                   |
| 5,625,196 | A  |   | 4/1997  | Williams                 |
| 6,308,914 | B1 |   | 10/2001 | Spurway et al.           |
| 6,422,743 | B1 | * | 7/2002  | Nirmalan et al. ... 250/330 |

* cited by examiner

*Primary Examiner*—Constantine Hannaher
(74) *Attorney, Agent, or Firm*—Kunzler & Associates

(57) ABSTRACT

Thermal response of a turbine component to application of thermal stimuli is automatically analyzed by regions of interest. Each region may be analyzed for conformance for a number of thermal response metrics, in an absolute sense, and/or relative to each other. The thermal response metrics may include the temperature threshold a particular region (e.g. the reference/primary region) exhibits a critical response size, and that the sub-region achieving the critical response size at the temperature threshold also has a critical shape. The analyses may be performed using the pixel values of the constituting pixels of a picture frame of the turbine component's thermal response. A binary passed or failed conclusion may be reached based on the results of the automated analyses.

70 Claims, 6 Drawing Sheets

AUTOMATED ANALYSIS OF TURBINE COMPONENT THERMAL RESPONSE

FIELD OF THE INVENTION

The invention relates to the field of infrared (IR) inspection of turbine components, such as turbine blades, turbine vanes, and other turbine items of the like having internal passages for cooling or other liquid/gas flow. More specifically, the invention relates to automated analysis of the thermal response of a turbine component to application of thermal stimuli to the turbine component by an IR inspection system to inspect the turbine component.

BACKGROUND OF THE INVENTION

Failure of a turbine component, such as a blade or a vane is costly, and may even be catastrophic. Accordingly, manufacturing a turbine component involves precision casting and machining processes, as each of these processes may introduce variables that affect the quality of the component, and in turn, its performance and reliability.

During the casting process, variables such as core misalignment, inclusions, and the like, can introduce casting defects into the components. Often times, these casting defects in turn may affect the machining process, resulting in machining defects, as well.

For example, a turbine component may include features such as cooling channels and holes. Cooling channels are internal features of the component through which coolants (e.g. in the form of gases) may flow. Because of the internal nature of the cooling channels, cooling channels are, often times, formed during the casting process utilizing casting cores. Defects, such as core misalignments may result in incorrectly formed, sized or blocked cooling channels.

The cooling holes allow the coolant flowing through the component to be exhausted out of the component. The dimension of the cooling holes may be in the range of 10ths of millimeters. Because of the small dimension of the cooling holes, often times, the cooling holes are machined into the component after the casting process. In order to control the precision of machining the cooling holes, an automated process may be utilized for the physical drilling of the holes, such as computerized numerically controlled (CNC) machine.

Drilling the cooling holes by CNC machine involves the CNC machine determining the exact position of the cooling holes in three-dimensional space, accounting for dimensional tolerances. If casting defects, such as core misalignments, affect the dimensions of the component to the extent that the dimensional tolerances are exceeded, the cooling holes may not be drilled properly.

Recently, inspection methods involving thermal signatures of materials, in particular, infrared (IR) detection imaging, are being utilized to inspect and detect defects in the manufacturing of turbine components. A turbine component inspection method utilizing IR imaging involves applying differential thermal stimuli to the turbine components. Often times, applying differential thermal stimuli involves delivering a first thermal stimulus, such as a gas, at a high temperature to the component, and then, following the high temperature thermal stimulus, delivering a second thermal stimulus, such as a gas, at a cold temperature (i.e., cold, relative to the high temperature thermal stimulus) to the turbine component. An example of an IR inspection apparatus may be found in co-pending U.S. Provisional Pat. Application No. 60/339,765 titled TURBINE COMPONENT INSPECTION SYSTEM, filed on Nov. 1, 2001, and having at least partial common inventorship with the present application. The application is incorporated herein in its entirety by reference.

To ensure the high precision turbine components are inspected properly, the inspection itself, including e.g. the application of the thermal stimulus, is preferably performed with great precision each time, with the inspection system properly calibrated. Moreover, minimal to virtually no judgment should be required of the operators, to avoid human error. Prior known systems all suffer from varying degrees of not able to ensure consistent application of thermal stimuli to inspections of different turbine components or different inspections of the same turbine component. Moreover, too often, too much operator judgment is required in determining whether a turbine component passed or failed an inspection. Thus, a computer assisted method, including automated analysis of the turbine components' thermal response to the applied thermal stimuli, and automated pass/fail conclusion, is desired.

SUMMARY OF INVENTION

In accordance with a first aspect of the present invention, thermal response of a turbine component to application of thermal stimuli to the thermal component is automatically analyzed by regions of interest.

In accordance with another aspect, each region is analyzed for conformance for a number of thermal response metrics. In various embodiments, the conformance is analyzed in an absolute sense, as well as relative to a reference/primary region.

In one embodiment, the thermal response metrics include the temperature threshold a particular region (e.g. the reference/primary region) exhibits a critical response size, and that the sub-region achieving the critical response size at the temperature threshold also has a critical shape.

In one embodiment, the analyses are performed using the pixel values of the constituting pixels of a picture frame of the turbine component's thermal response.

In accordance with yet another aspect, a binary passed or failed conclusion is reached based on the results of the automated analyses.

In one embodiment, a computing apparatus is equipped with executable instructions designed to perform the automated analyses.

BRIEF DESCRIPTION OF THE DRAWINGS

The invention is illustrated by way of example and not by way of limitation in the figures of the accompanying drawings, in which the like references indicate similar elements and in which.

DETAILED DESCRIPTION OF THE INVENTION

As summarized earlier, the present invention includes the provision of a function to a computing apparatus to automatically analyze the thermal response of a turbine component to application of thermal stimuli to the thermal component. In a preferred embodiment, the provided function is also advantageously equipped to draw a binary pass/fail conclusion based on the results of the automated analyses.

In the following description, various aspects of the invention will be described. However, it will be apparent that the invention may be practiced with only some or all described aspects. For purposes of explanation, specific numbers, materials and configurations are set forth in order to provide a thorough understanding of the invention. However, it will also be apparent that the invention may be practiced without the specific details. In other instances, well-known features are omitted or simplified in order not to obscure the invention.

Parts of the description will be presented in terms of operations performed by a digital system, using terms such as data, pixel, pixel values, determining, and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical, electrical, and optical components of the digital system. The term digital system includes general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation, and selected ones of these operations may also be performed in parallel.

Further, the description repeatedly uses the phrase "in one embodiment", which ordinarily does not refer to the same embodiment, although it may.

Overview

Figure 1:
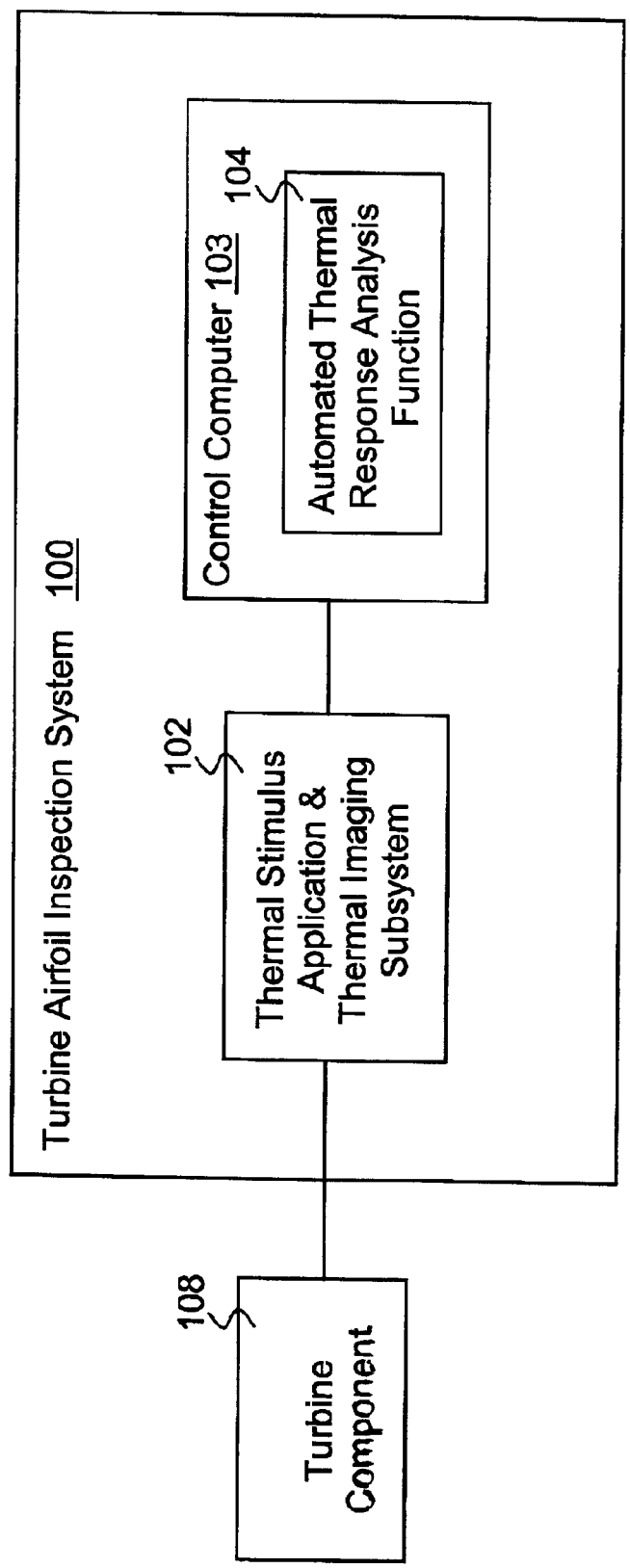
FIG. 1 illustrates an overview of the present invention.

Referring now to FIG. 1, wherein a block diagram illustrating an overview of the present invention is shown. As illustrated, turbine component inspection system 100, used to thermally inspect turbine component 108, comprises thermal stimulus application and thermal imaging subsystem 102, augmented with control computer 103. For the embodiment, control computer 103 includes in particular, automated thermal response analysis function 104 to automatically analyze the thermal response of turbine component 108 to application of thermal stimuli to turbine component 108 for inspecting turbine component 108. As will be described in more detail below, in a preferred embodiment, automated thermal response analysis function 104 performs its analysis using pixel values of the pixel of a pictorial frame of the thermal response of turbine component 108 generated by thermal imaging subsystem 102. More specifically, in the preferred embodiment, the analyses are performed using the "peak" pictorial frame, which the pictorial frame generated at the moment in time when a reference point reaches the temperature of the "hot" thermal stimulus applied to turbine component 108. In alternate embodiments, more than one frame or a frame other than the "peak" frame may be analyzed instead.

Turbine component 108 represents a broad range of components, such as turbine blades, turbine vanes or other turbine components of the like, having e.g. internal passages or cooling channels that lend themselves to thermal inspection, i.e. inspection through analysis of the thermal signatures of these turbine components responsive to application of thermal stimuli. Similarly, turbine component inspection system 100 represents a broad range of turbine component thermal inspection system, including but are not limited to the inspection system disclosed in the aforementioned co-pending patent application number 60/339,765.

Thermal Image

Figure 2A:
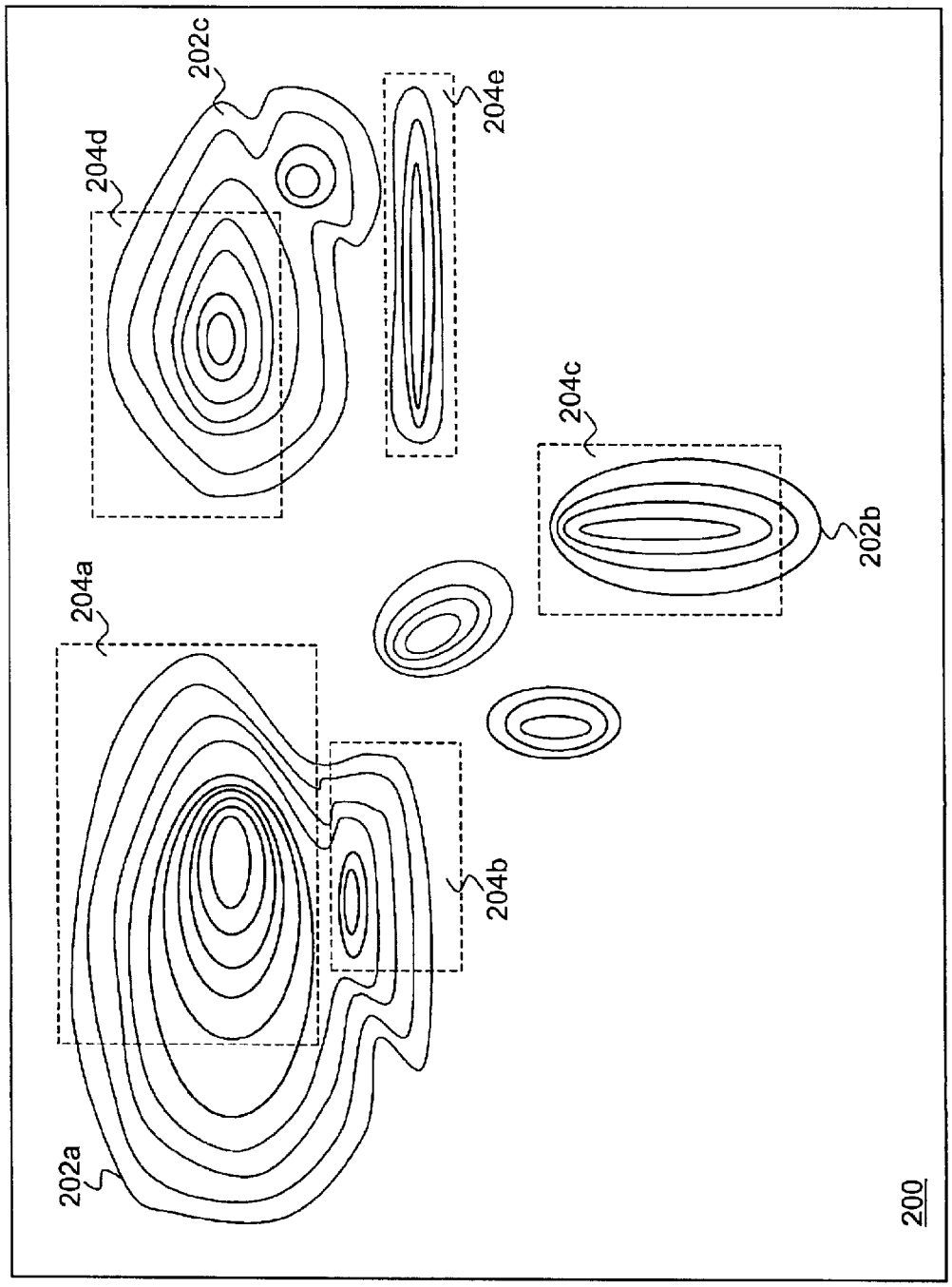
FIGS. 2a–2c illustrate an exemplary pictorial frame of the thermal response of a turbine component to an application of thermal stimuli, an exemplary region of interest, and an exemplary thermal response with an exemplary region of interest respectively.

FIG. 2a illustrates an exemplary frame of a 2-D thermal image of the thermal response of a turbine component to thermal stimuli applied to the turbine component. The exemplary frame is one of a plurality of frames of thermal images of the thermal response of the turbine component as captured by thermal imaging subsystem 102. As illustrated, the 2-D thermal image 200 comprises a number of groups of thermal contours 202a–202c depicting the surface temperatures of the turbine component. Each thermal contour corresponds to a temperature level. Typically, in a gray-scale display, the areas between the thermal contours will take on different degrees of "grayness" corresponding to the temperatures. In a multi-color display, the areas between the thermal contours will assume different colors. In other words, the constituting pixels of the pictorial frame are comprised of pixels with pixel values corresponding to the surface temperatures of the turbine component.

For the embodiment, thermal imaging subsystem 102 simultaneously captures the thermal response of turbine component 108 from three perspectives, the pressure side, the suction side and the leading edge. Accordingly, 2-D thermal image 200 is a composite image of the surface temperatures of the turbine component as seen from these three perspectives, i.e. the pressure side, the suction side and the leading edge perspective.

Further, in accordance with one aspect of the present invention, the automatic thermal response analyses performed by thermal response analyses function 104 are performed by regions of interest. Shown also in exemplary thermal image 200 are five regions of interest 204a–204e representing the regions of interest at the pressure side and trailing edge (region 204a), the pressure side and leading edge (region 204b), the leading edge (region 204c), the suction side and trailing edge (region 204d), and the suction side and leading edge (region 204e).

The regions of interest are design dependent. That is, the regions of interest vary between different turbine component designs. More specifically, the regions of interest vary depending on the designs of the internal cooling channels. The regions of the interest for a particular design are empirically determined, by examining and comparing known good turbine components of the design and known defecting turbine components of the design. Other techniques or information may also be employed to empirically select the regions of interest. Obviously, the larger the sample employed for making the empirical determination, the more likely the regions of interest will be well chosen. However, even if less than optimal choices are made for the regions of the interest, turbine component inspection may nevertheless benefit from the automated thermal response analyses of the present invention.

In one embodiment, each region of interest is specified to the automated thermal response analysis function 104 by specifying the coordinates of the critical points or vertices of the region. For example, for the illustrated exemplary rectangular regions of interest, the regions may be specified by specifying the coordinates of the four vertices of each of the rectangular region. Note that while for ease of understanding, only rectangular regions of interest are illustrated, the present invention may be practiced with regions of interest that are non-rectangular in shape.

Specification of the coordinates of the critical points or vertices defining a region to automated response analysis function 104 may be made via any one of a number of input techniques known in the art, including but not limited to comma separated values (CSV), and form based end user interface.

Figure 2B:
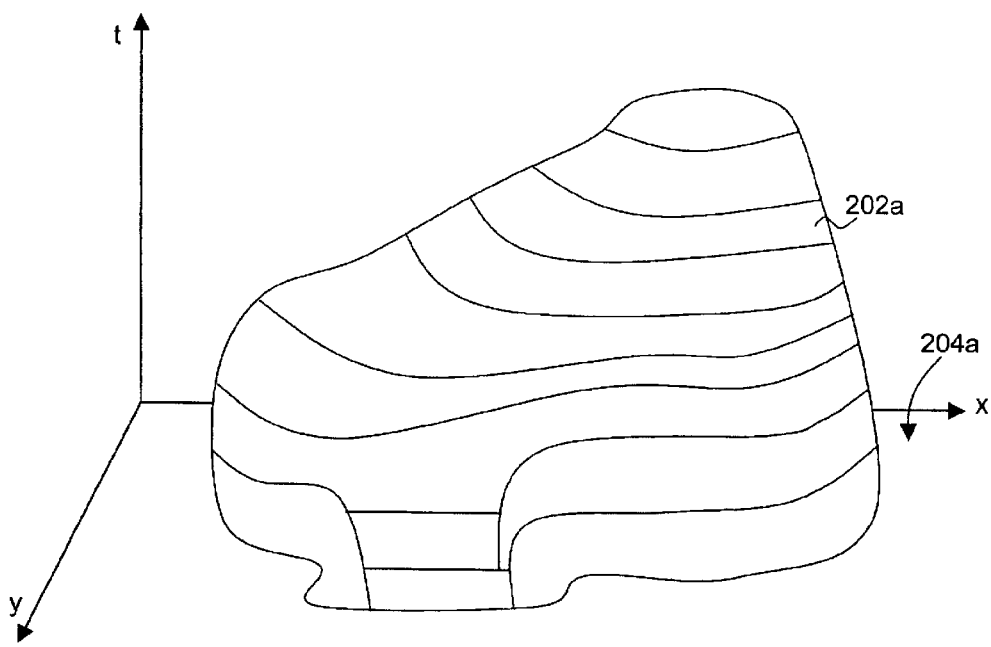

FIG. 2b illustrates an exemplary 3-D depiction of the thermal response of the turbine component for the region of interest 204a. The vertical axis (T) is the temperature axis. Similar to the 2-D depiction, typically, each spatial layer between two temperature contours will assume a different "grayness" in a gray-scale display or a different color in a multi-color display.

Figure 2C:
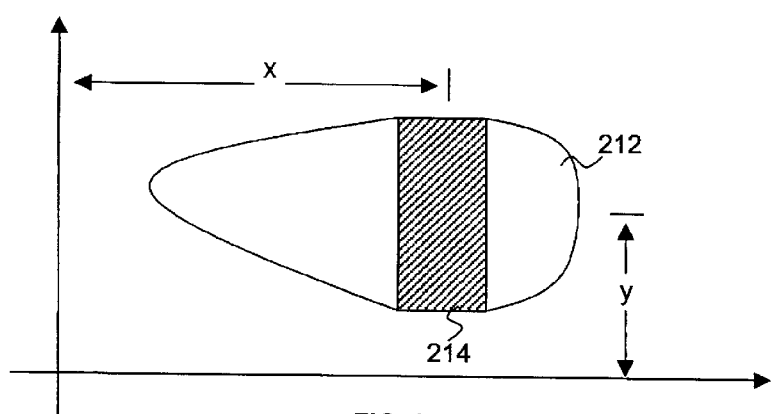

FIG. 2c illustrates an exemplary 2-D depiction of sub-region 212 within a region of interest. Sub-region 212 comprises pixels with pixel values greater than a corresponding temperature threshold. As will be described in more detail below, in a preferred embodiment of the present invention, automated thermal response analyses performed by automated thermal response analysis function 104 comprises analysis of a region of interest's conformance for a number of thermal response metrics. In the preferred embodiment, these thermal response metrics include temperature thresholds, the area size and shape of sub-region 212. That is, in the preferred embodiment, automated thermal response analysis function 104 analyzes the thermal response of the region of interest of turbine component 108 for whether the thermal response of the region of interest reaches a desired critical response at certain threshold temperature, and whether the reached thermal response is of a desired critical size.

In the preferred embodiment, area size analysis is performed by determining the number of pixels within the region of interest having pixel values greater than the pixel value corresponding to the temperature threshold. Further, shape analysis is performed, by computing and comparing the weighted moments of the sub-region in the x as well as the y direction. In one embodiment, for each direction (x or y), up to four moment orders, zero, first, second, and third moment order are considered in performing the shape analysis. In alternate embodiments, more or less moment orders may be used.

The zero moment in the x direction is computed by summing the weights of the computational segments (such as segment 214) along the x-axis. The first moment in the x direction is computed by summing the products of the weights of the computational segments (such as segment 214) multiplied by the corresponding centroids' distances along the x-axis. The second moment in the x direction is computed by summing the products of the weights of the computational segments (such as segment 214) multiplied by the square of the corresponding centroids' distances along the x-axis. The third moment in the x direction is computed by summing the products of the weights of the computational segments (such as segment 214) multiplied by the cubes of the centroids' distances along the x-axis. The corresponding moments in the y-direction are computed in a like manner.

Further, in one embodiment, the computed moment values are adjusted to compensate for the location of the centroid of the sub-region. In one embodiment, the adjusted moment values are normalized to "remove" it from the pixel domain. In yet another embodiment, invariant versions of the moment values (without directional orientations), with zooming and rotational effects removed, are derived from the normalized moment values.

Mathematically, the computations are given by the following formulas:

Moment calculations:

$$\text{moments}(img) := \begin{cases} r\text{Max} \leftarrow \text{rows}(img) - 1 \\ c\text{Max} \leftarrow \text{cols}(img) - 1 \\ m_{0,0} \leftarrow \sum_{i=0}^{r\text{Max}} \sum_{j=0}^{c\text{Max}} img_{i,j} \\ m_{1,0} \leftarrow \sum_{i=0}^{r\text{Max}} \left( \sum_{j=0}^{c\text{Max}} img_{i,j} \right) \cdot i \\ m_{2,0} \leftarrow \sum_{i=0}^{r\text{Max}} \left( \sum_{j=0}^{c\text{Max}} img_{i,j} \right) \cdot i \cdot i \\ m_{3,0} \leftarrow \sum_{i=0}^{r\text{Max}} \left( \sum_{j=0}^{c\text{Max}} img_{i,j} \right) \cdot i \cdot i \cdot i \\ m_{0,1} \leftarrow \sum_{j=0}^{c\text{Max}} \left( \sum_{i=0}^{r\text{Max}} img_{i,j} \right) \cdot j \\ m_{0,2} \leftarrow \sum_{j=0}^{c\text{Max}} \left( \sum_{i=0}^{r\text{Max}} img_{i,j} \right) \cdot j \cdot j \\ m_{0,3} \leftarrow \sum_{j=0}^{c\text{Max}} \left( \sum_{i=0}^{r\text{Max}} img_{i,j} \right) \cdot j \cdot j \cdot j \\ m_{1,1} \leftarrow \sum_{i=0}^{r\text{Max}} \left( \sum_{j=0}^{c\text{Max}} img_{i,j} \cdot i \cdot j \right) \\ m_{1,2} \leftarrow \sum_{i=0}^{r\text{Max}} \left( \sum_{j=0}^{c\text{Max}} img_{i,j} \cdot i \cdot j \cdot j \right) \\ m_{2,1} \leftarrow \sum_{i=0}^{r\text{Max}} \left( \sum_{j=0}^{c\text{Max}} img_{i,j} \cdot i \cdot i \cdot j \right) \\ m \end{cases}$$

where "img" is the thermal image with pixels of the sub-region have pixel values of "1", and pixels outside the sub-region having pixel values of "0";

$m_{i,j}$ stands for a moment value of ith order in the y-direction, jth order in the x-direction Central Moments:

$$\text{cmoments}(m) := \begin{cases} \mu_{0,0} \leftarrow m_{0,0} \\ \mu_{1,0} \leftarrow 0 \\ \mu_{0,1} \leftarrow 0 \\ \mu_{1,1} \leftarrow m_{1,1} - \frac{(m_{1,0} \cdot m_{0,1})}{m_{0,0}} \\ \mu_{2,0} \leftarrow m_{2,0} - \frac{(m_{1,0} \cdot m_{1,0})}{m_{0,0}} \\ \mu_{0,2} \leftarrow m_{0,2} - \frac{(m_{0,1} \cdot m_{0,1})}{m_{0,0}} \\ Xc \leftarrow \frac{m_{1,0}}{m_{0,0}} \\ Yc \leftarrow \frac{m_{0,1}}{m_{0,0}} \\ \mu_{3,0} \leftarrow m_{3,0} - 3 \cdot Xc \cdot m_{2,0} + 2 \cdot m_{1,0} \cdot Xc \cdot Xc \\ \mu_{0,3} \leftarrow m_{0,3} - 3 \cdot Yc \cdot m_{0,2} + 2 \cdot m_{0,1} \cdot Yc \cdot Yc \\ \mu_{1,2} \leftarrow m_{1,2} - 2 \cdot Yc \cdot m_{1,1} - Xc \cdot m_{0,2} + 2 \cdot m_{1,0} \cdot Yc \cdot Yc \\ \mu_{2,1} \leftarrow m_{2,1} - 2 \cdot Xc \cdot m_{1,1} - Yc \cdot m_{2,0} + 2 \cdot m_{0,1} \cdot Xc \cdot Xc \\ \mu \end{cases}$$

where $\mu_{i,j}$ stands for a "centralized" moment value of ith order in the y-direction, jth order in the x-direction;
"$X_c$" is the x-coordinate of the centroid;
"$Y_c$" is the y-coordinate of the centroid.

Normalized Central Moments:

$$\lambda(p, q) := \frac{(p+q)}{2} + 1$$

$$\text{norm}(\mu, p, q) := \frac{\mu_{p,q}}{\left[(\mu_{0,0})^{\lambda(p,q)}\right]}$$

$$\text{nmoments}(\mu) := \begin{vmatrix} \text{for } i \in 0 \ldots 3 \\ \quad \text{for } j \in 0 \ldots 3 \\ \quad\quad \eta_{i,j} \leftarrow \text{norm}(\mu, i, j) \\ \eta \end{vmatrix}$$

where $n_{i,j}$ stands for a "normalized" moment value of ith order in the y-direction, jth order in the x-direction;

Invariant moments:

$$\text{imoments}(\eta) := \begin{vmatrix} \phi_1 \leftarrow \eta_{2,0} + \eta_{0,2} \\ \phi_2 \leftarrow (\eta_{2,0} - \eta_{0,2})^2 + 4 \cdot (\eta_{1,1})^2 \\ \phi_3 \leftarrow (\eta_{3,0} - 3 \cdot \eta_{1,2})^2 + (3 \cdot \eta_{2,1} + \eta_{0,3})^2 \\ \phi_4 \leftarrow (\eta_{0,3} + \eta_{1,2})^2 + (\eta_{2,1} + \eta_{0,3})^2 \\ \phi \end{vmatrix}$$

where $\phi_k$ stands for an invariant moment value.

In one embodiment, the weight of each computational segment is the number of constituting pixels of the computational segment. The size of each computational segment is implementation dependent. A finer computational segment is employed when higher precision is desired. However a coarser computation segment may be employed instead, when relatively lower precision is acceptable.

In one embodiment, an acceptance range for each of the thermal metrics analyzed by automated thermal response function 104 is also specified to automated thermal response function 104 for each region of interest. For example, for a reference/primary region, an acceptance range is specified for the temperature threshold the critical response area size is to be reached, and an acceptance range for the desired shape. For each other region, an acceptance range is specified for the critical response area size, and acceptance ranges are specified for the various moment values indicative of the desired critical shape.

In one embodiment, where the thermal metrics are analyzed for relative proportionality between a reference/primary region and a secondary region, an acceptance range is also specified for the relative proportionality for each of the thermal metrics analyzed by automated thermal response function 104 for each region.

In one embodiment, specification of these acceptance ranges for the thermal metrics for each region is made in conjunction with the specification of the region. For example, a region of interest may be specified along with the acceptance ranges of the thermal metrics as follows:

R={Vertices[(x1, y1), (x2, y2), (x3, y3), (x4, y4)], Metric1 (lab, uab), Metric2(lab, uab). . . }, where "lab" is lower acceptance boundary, and "uab" is upper acceptance boundary.

Again, the specifications may be made through any one of a number of input techniques known in art, including but not limited to comma separated values (CSV), and form based user interface.

Operation Flow

Figure 3A:
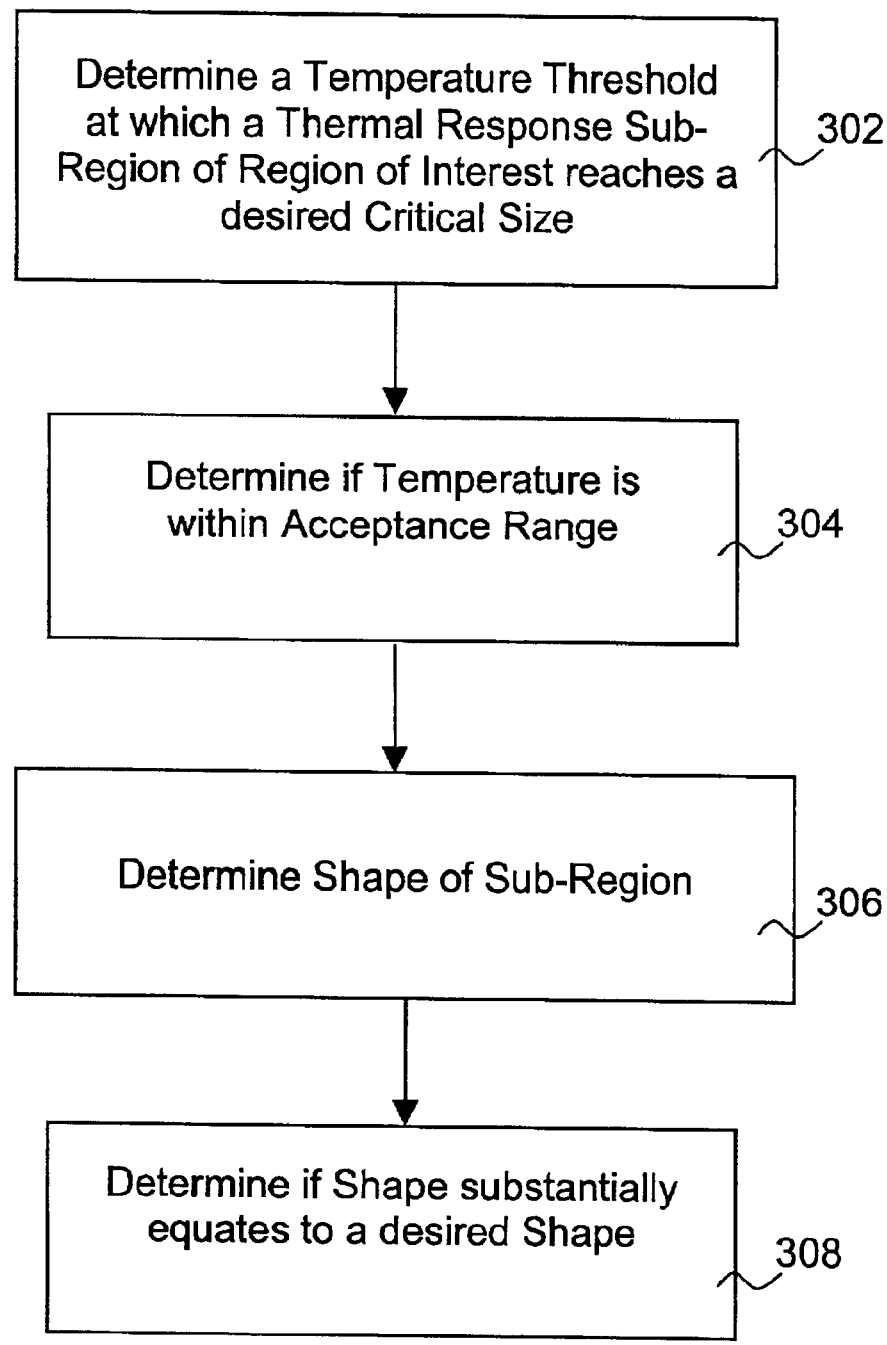
FIGS. 3a–3b illustrate operational flow of the relevant aspects of the automated turbine component thermal response analysis function of FIG. 1 in further detail, in accordance with one embodiment.
Figure 3B:
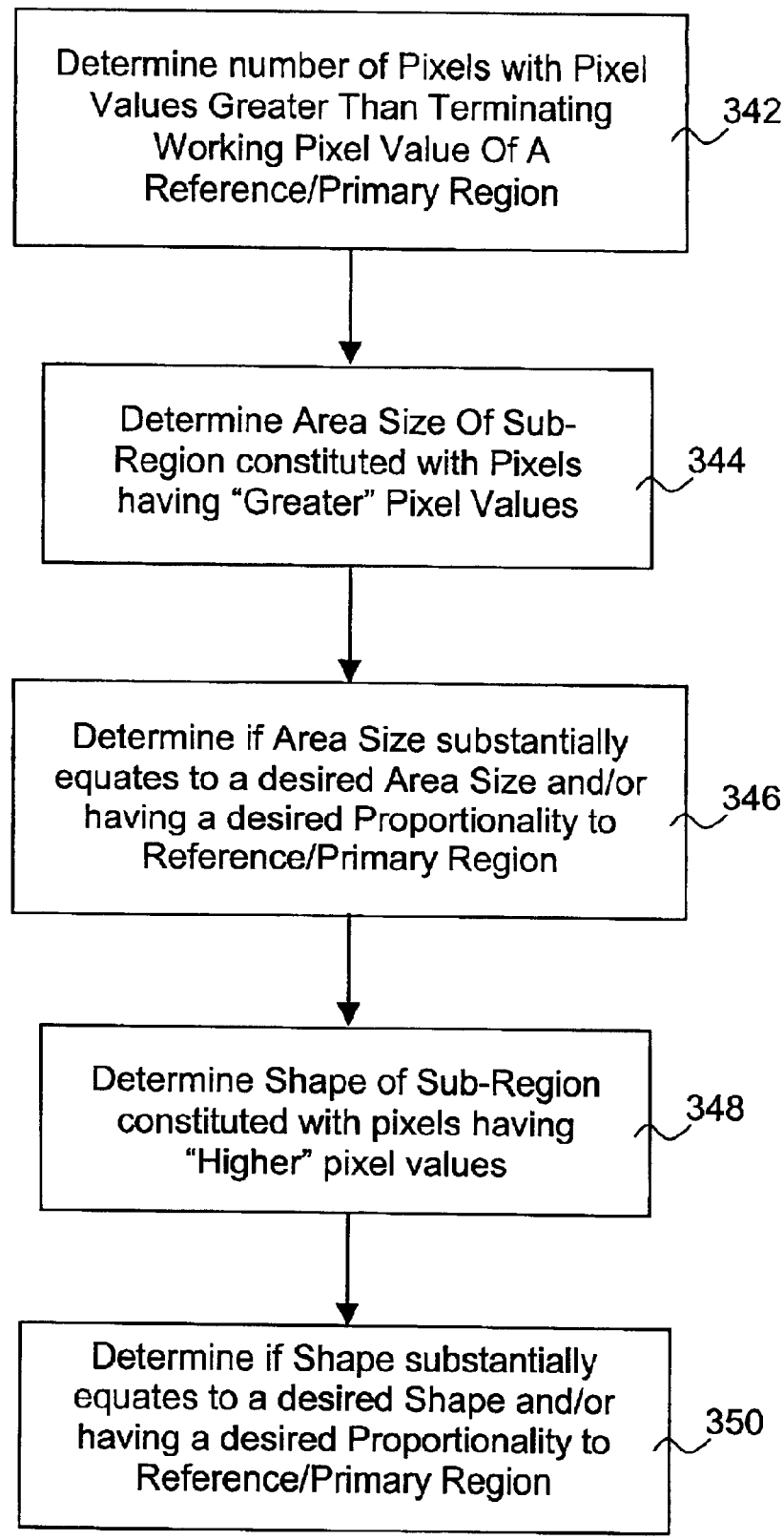

FIGS. 3a–3b illustrate the operation flow of the relevant aspects of automated thermal response analysis function 104, in accordance with one embodiment. More specifically, FIG. 3a illustrates the operation flow of the automated thermal response analysis function 104 in analyzing a reference/primary region of interest (e.g. a region located at the pressure side and trailing edge of a turbine component), whereas FIG. 3b illustrates the operation flow of the automated thermal response analysis function 104 in analyzing a secondary region of interest (e.g. a region located at the pressure side and leading edge of a turbine component, or a region located at the suction side, trailing/leading edge of a turbine component or a region located at the leading edge of a turbine component).

As illustrated in FIG. 3a, for the reference/primary region of interest, automated thermal response analysis function 104 (hereinafter simply function 104) first determines a temperature threshold at which a sub-region within the reference/primary region of interest reaches at least a critical thermal response or area size, block 302. In one embodiment, the determination is made by first setting a working pixel value to an arbitrary high pixel value, and then analysis is made to determine how many pixels within the region of interest have pixel values greater than the current working pixel value. The number of pixels having pixel values greater than the current working pixel value is compared to the desired critical response area size. If the number of pixels having pixel values greater than the current working pixel value is less than the desired critical response area size, the working pixel value is lower by a predetermined amount. Upon doing so, analysis is made again to determine how many pixels within the region of interest have pixel values greater than the current working pixel value. The number of pixels having pixel values greater than the current working pixel value is compared to the desired critical response area size. The process continues in this manner until eventually the sub-region has an area size that substantially equates to the desired critical response area size.

Continuing to refer to FIG. 3a, once the temperature threshold at which a sub-region within the reference/primary region of interest reaches at least a critical thermal response or area size is determined, function 104 determines whether the temperature threshold is within the specified acceptance range, block 304.

Next, for the embodiment, function 104 determines the shape of the sub-region constituted with pixels having "greater" pixel values, block 306. In one embodiment, as described earlier, function 104 determines the shape of the sub-region by determining the moment values for a number of moment orders for both the x and y directions (including the earlier described centroid compensation, normalization, and invariant calculations if implemented). Upon determining the shape of the sub-region, more specifically, the characteristic moment values, function 104 determines based on the computed moment values, whether the shape substantially equates to a desired shape, block 308.

As illustrated in FIG. 3b, for a secondary region of interest, function 104 first determines the number of pixels with pixel values greater than the terminating pixel value of the reference/primary region, block 342. Then function 104 determines the area size of the sub-region constituted with pixels having "greater" pixel values, block 344. As before, function 104 determines the area size by determining the number of constituting pixels of the sub-region. Upon determining the area size of the sub-region, function 104 determines whether the area size substantially equates to a desired area size, block 346. For the embodiment, function 104 further determines whether the area size is substantially proportional to the area size of a corresponding sub-region of the reference/primary region of interest, block 346.

Next, for the embodiment, function 104 determines the shape of the sub-region constituted with pixels having "greater" pixel values, block 348. As before, function 104 determines the shape of the sub-region by determining the moment values for a number of moment orders for both the x and y directions (including the earlier described centroid compensation, normalization, and invariant calculations if implemented). Upon determining the shape of the sub-region, function 104 determines based on the computed moment values, whether the shape substantially equates to a desired shape, block 350. For the embodiment, function 104 further determines whether the shape substantially complements the shape of a corresponding sub-region of the reference/primary region of interest, block 350.

Example Computer System

Figure 4:
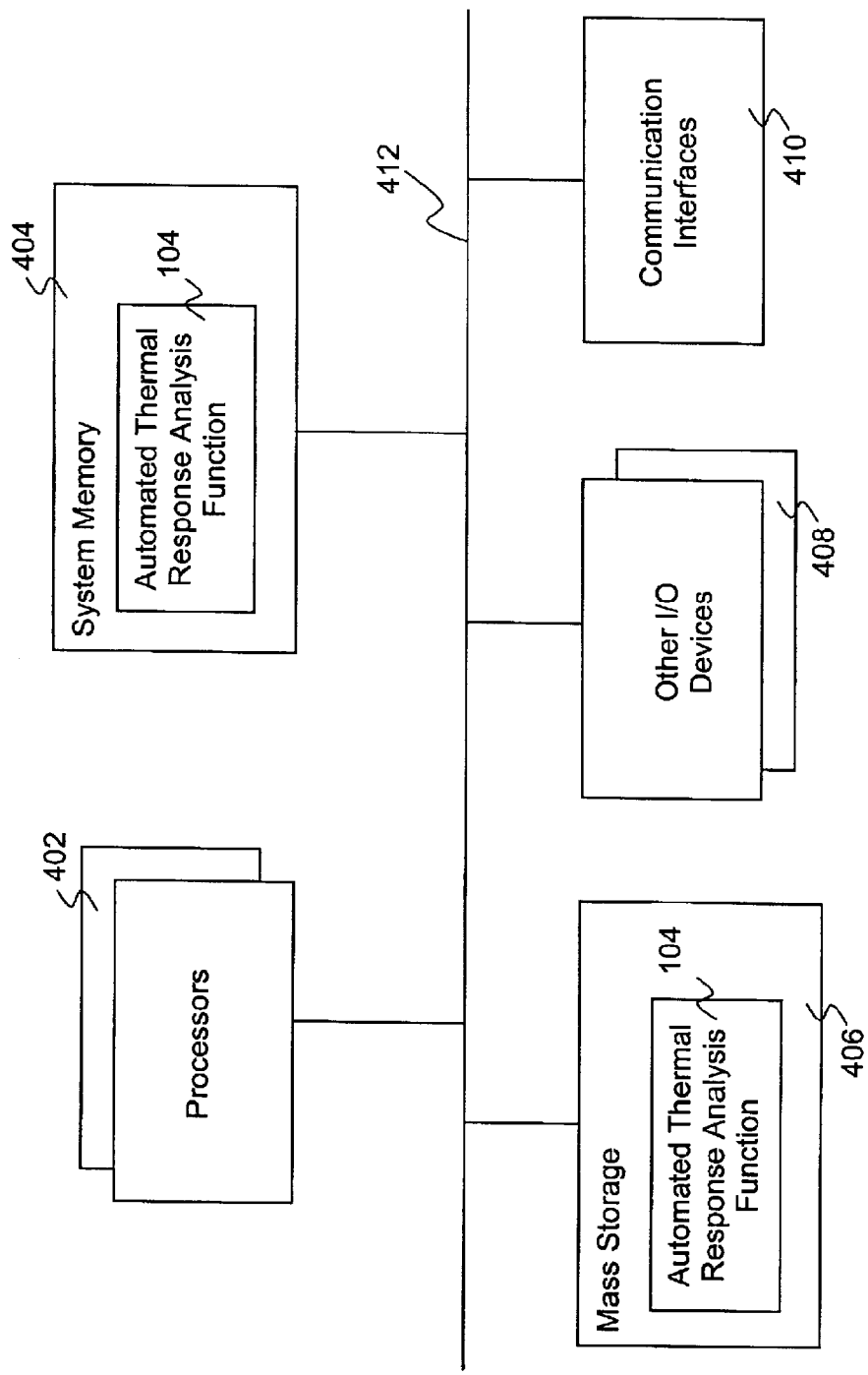
FIG. 4 illustrates a computer system suitable for use to practice the present invention, in accordance with one embodiment.

FIG. 4 illustrates one embodiment of an exemplary digital system suitable for use as control computer 103 to practice the present invention. As shown, exemplary digital system 103 includes one or more processors 402 and system memory 404. Additionally, system 400 includes mass storage devices 406 (such as diskette, hard drive, CDROM and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, the buses are bridged by one or more bus bridges (not shown). Each of these elements performs its conventional functions known in the art. In particular, system memory 404 and mass storage 406 are employed to store a working copy and a permanent copy of the programming instructions implementing the teachings of the present invention (automated thermal response analysis function 104). The permanent copy of the programming instructions may be loaded into mass storage 406 in the factory, or in the field, through a distribution medium (not shown) or through communication interface 410 from a distribution server (not shown). The constitution of these elements 402–412 are known, and accordingly will not be further described.

In alternate embodiments, the present invention may be practiced in computing environment that spans multiple computing systems networked together locally or across a wide area, through private and/or public networks.

CONCLUSION AND EPILOG

Thus, a novel method and apparatus for automatically analyzing the thermal response of a turbine component to application of thermal stimuli, to facilitate more accurate and consistent inspection of turbine components has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a computing environment, an automated turbine component thermal response analysis method, comprising:
   selecting a region of interest;
   determining a temperature threshold at which a sub-region within the selected region of interest has an area size equal to or greater than a critical area size, the sub-region having locations with temperatures equal to or greater than the temperature threshold;
   determining whether the determined temperature threshold is within a temperature threshold acceptance range; and
   if there is more than one region of interest, repeating said selecting of region of interest and said determining for the selected region of interest for each region of interest.

2. The method of claim 1, wherein said method further comprises selecting a frame of a thermal image comprising a plurality of pixels having pixel values corresponding to temperature; and
   said determining of a temperature threshold comprises setting a working pixel value to a predetermined pixel value, and determining whether the number of pixels having pixel values greater than the working pixel value substantially equate to the critical area size.

3. The method of claim 2, wherein said determining of a temperature threshold further comprises
   adjusting the working pixel value to a next pixel value to cause the number of pixels having pixel values greater than the working pixel value to equate closer to the critical area size, if the number of pixels having pixel values greater than the working pixel value do not substantially equate the critical area size; and
   repeating said determining of whether the number of pixels having pixel values greater than the working pixel value substantially equate to the critical area size.

4. The method of claim 3, wherein said determining of a temperature threshold further comprises deriving the temperature threshold in accordance with the working pixel value that yielded a quantity of pixels with pixel values greater than the working pixel value, substantially equate to the critical area size.

5. The method of claim 4, wherein said selecting of a frame of a thermal image comprises selecting a peak frame from a plurality of frames.

6. The method of claim 1, wherein the selected region of interest is a primary region of interest.

7. The method of claim 1 wherein the selected region of interest is a region located in a selected one of a pressure side and leading edge, a pressure side and trailing edge, a suction side and leading edge, a suction side and trailing edge, and a leading edge of the turbine component.

8. The method of claim 1, wherein said determining for the further comprising determining a sub-region within the selected region of interest, the sub-region having locations with temperatures greater than or equal to a temperature threshold.

9. The method of claim 8, wherein the temperature threshold is a determined temperature at which a sub-region within a primary region of interest reaches a critical area size.

10. The method of claim 8, further comprising determining whether the sub-region's area size is within a corresponding area size acceptance range.

11. The method of claim 8, further comprising determining whether a ratio of the sub-region's area size to a reference sub-region's area size is within a corresponding area size ratio acceptance range.

12. The method of claim 11, wherein the selected region of interest is a secondary region of interest, and the reference sub-region is a sub-region within a primary region of interest.

13. The method of claim 8, wherein the selected region of interest is a secondary region of interest.

14. The method of claim 8, where in the selected region of interest is a region located in a selected one of a pressure side and leading edge, pressure side and trailing edge, suction side and leading edge, suction side and trailing edge, and leading edge of the turbine component.

15. The method of claim 1, further comprising determining whether a sub-region within the selected region of interest has a shape that substantially equates to a critical shape.

16. The method of claim 15, wherein said method further comprises selecting a frame of a thermal image comprising a plurality of pixels; and
said determining of whether the sub-region's shape substantially equates to a critical shape comprises performing one or more weighted moment analyses based on constituting pixels of the sub-region.

17. The method of claim 16, wherein each of the one or more weighted moment analyses comprises determining a weighted moment value, and determining whether the weighted moment value is within a corresponding moment value acceptance range.

18. The method of claim 17, wherein the weighted moment value is a weighted moment value of a selected combination of moment orders of a first and a second direction.

19. The method of claim 18, wherein the weighted moment orders are selected from a group comprising a zero order moment, a first order moment, a second order moment, and a third order moment.

20. The method of claim 17, wherein the weighted moment value is a selected one of a centroid compensated weighted moment value, a normalized weighted moment value and an invariant weighted moment value.

21. The method of claim 17, wherein said selecting of a frame of a thermal image comprises selecting a peak frame from a plurality of frames.

22. The method of claim 15, further comprising determining whether the sub-region's shape corresponds to a reference sub-region's shape in an expected way.

23. The method of claim 22, wherein the selected region of interest is a secondary region of interest, and the reference sub-region is a sub-region within a primary region of interest.

24. The method of claim 1, wherein the method further comprises deciding based at least in part on the results of said determining, whether the turbine component should be considered as having passed or failed the inspection.

25. In a computing environment, an automated turbine component thermal response analysis method, comprising:
setting a working pixel value to a predetermined pixel value;
determining whether the number of pixels within a region of a frame having pixel values greater than the working pixel value substantially equate to a critical area size, the frame pictorially capturing thermal response of a turbine component to thermal stimuli applied to the turbine component,
adjusting the working pixel value to a next pixel value to cause the number of pixels within the region having pixel values greater than the working pixel value to equate closer to the critical area size, if the number of pixels within the region having pixel values greater than the working pixel value do not substantially equate the critical area size; and
repeating said determining of whether the number of pixels within the region having pixel values greater than the working pixel value substantially equate to the critical area size, and said adjusting, until the number of pixels within the region having pixel values greater than the working pixel value substantially equate to the critical area size.

26. The method of claim 25, wherein said method further comprises deriving a temperature threshold in accordance with the working pixel value that yielded a quantity of pixels within the region with pixel values greater than the working pixel value, substantially equate to the critical area size.

27. The method of claim 25 wherein the method further comprises performing one or more weighted moment analyses based on the pixels within the region with pixel values greater than the terminating working pixel value.

28. The method of claim 27, wherein each of the one or more weighted moment analyses comprises determining a weighted moment value, and determining whether the weighted moment value is within a corresponding moment value acceptance range for the moment order.

29. The method of claim 28, wherein the weighted moment value is a weighted moment value of a selected combination of moment orders of a first and a second direction.

30. The method of claim 29, wherein the weighted moment orders are selected from a group comprising a zero order moment, a first order moment, a second order moment, and a third order moment.

31. The method of claim 28, wherein the weighted moment value is a selected one of a centroid compensated weighted moment value, a normalized weighted moment value and an invariant weighted moment value.

32. In a computing environment, an automated turbine component thermal response analysis method, comprising:
processing a subset of pixels within a region of a frame pictorially capturing thermal response of a turbine component to thermal stimuli applied to the turbine component to compute a weighted moment value of a first moment order in a first direction and a second moment order in a second direction; and
determining based at least in part on said weighted moment value, whether the subset of pixels substantially equate to a critical shape.

33. The method of claim 32, wherein said moment orders are selected from a group comprising a zero moment order, a first moment order, a second moment order, and a third moment order.

34. The method of claim 32, wherein said processing of the subset of pixels within the region is performed a plurality of times to compute a plurality of said weight moment values;
the method further comprises computing one or more derivative moment values based on said plurality of weighted moment values; and
said determining is further based on said one or more derivative moment values.

35. The method of claim 34, wherein said one or more derivative moment values comprises one or more of a centroid compensated moment value, a normalized moment value, and an invariant moment value.

36. An apparatus comprising:
- at least one storage unit having stored therein programming instructions designed to enable the apparatus to
  select a region of a thermal image of a turbine component's thermal response to application of thermal stimuli to the turbine component, corresponding to a region of interest,
  determine a temperature threshold at which a sub-region within the region of interest has an area size equal to or greater than a critical area size, the sub-region having locations with temperatures equal to or greater than the temperature threshold, and
  determine whether the determined temperature threshold is within a temperature threshold acceptance range,
  repeat said selection of a corresponding region of a thermal image, and said determination for the region of interest, for each region of interest if there is more than one region of interest; and
- at least one processor coupled to the at least one storage unit to execute the programming instructions.

37. The apparatus of claim 36, wherein the programming instructions further enable the apparatus to
- select a frame of a thermal image comprising a plurality of pixels having pixel values corresponding to temperature as said thermal image, and
- perform said determining by setting a working pixel value to a predetermined pixel value, and determine whether the number of pixels having pixel values greater than the working pixel value substantially equate to the critical area size.

38. The apparatus of claim 37, wherein said programming instructions enable said apparatus to perform said determining by
- adjusting the working pixel value to a next pixel value to cause the number of pixels having pixel values greater than the working pixel value to equate closer to the critical area size, if the number of pixels having pixel values greater than the working pixel value do not substantially equate the critical area size; and
- repeating said determining of whether the number of pixels having pixel values greater than the working pixel value substantially equate to the critical area size.

39. The apparatus of claim 38, wherein said programming instructions enable the apparatus to perform said determining by additionally deriving the temperature threshold in accordance with the working pixel value that yielded a quantity of pixels with pixel values greater than the working pixel value, substantially equate to the critical area size.

40. The apparatus of claim 39, wherein said programming instructions enable the apparatus to perform said selecting of a frame of a thermal image by selecting a peak frame from a plurality of frames.

41. The apparatus of claim 36, wherein the region of interest is a primary region of interest.

42. The apparatus of claim 36, wherein the region of interest is a region located in a selected one of a pressure side and leading edge, a pressure side and trailing edge, a suction side and leading edge, a suction side and trailing edge, and a leading edge of the turbine component.

43. The apparatus of claim 36, wherein said programming instructions enable the apparatus to determine a sub-region within the region of interest, the sub-region having locations with temperatures greater than or equal to a temperature threshold.

44. The apparatus of claim 43, wherein the temperature threshold is a determined temperature at which a sub-region within a primary region of interest reaches a critical area size.

45. The apparatus of claim 43, wherein said programming instructions enable the apparatus to perform said determining by determining whether the sub-region's area size is within a corresponding area size acceptance range.

46. The apparatus of claim 45, wherein said programming instructions enable the apparatus to perform said determining by determining whether a ratio of the sub-region's area size to a reference sub-region's area size is within a corresponding area size ratio acceptance range.

47. The apparatus of claim 46, wherein the region of interest is a secondary region of interest, and the reference sub-region is a sub-region within a primary region of interest.

48. The apparatus of claim 43, wherein the region of interest is a secondary region of interest.

49. The apparatus of claim 43, wherein the region of interest is a region located in a selected one of a pressure side and leading edge, pressure side and trailing edge, suction side and leading edge, suction side and trailing edge, and leading edge of the turbine component.

50. The apparatus of claim 36, wherein said programming instructions enable the apparatus to perform said determining by determining determine whether a sub-region within the selected region of interest has a shape substantially that equates to a critical shape.

51. The apparatus of claim 50, wherein said programming instructions further enable the apparatus to
- select a frame of a thermal image comprising a plurality of pixels as the thermal image, and
- perform said determining by performing one or more weighted moment analyses based on constituting pixels of the sub-region.

52. The apparatus of claim 51, wherein said programming instructions enable the apparatus to perform each of the one or more weighted moment analyses by determining a weighted moment value, and determining whether the weighted moment value is within a corresponding moment value acceptance range.

53. The apparatus of claim 52, wherein the weighted moment value is a weighted moment value of a selected combination of moment orders of a first and a second direction.

54. The apparatus of claim 53, wherein the weighted moment orders are selected from a group comprising a zero order moment, a first order moment, a second order moment, and a third order moment.

55. The apparatus claim 53, wherein the weighted moment value is a selected one of a centroid compensated weighted moment value, a normalized weighted moment value and an invariant weighted moment value.

56. The apparatus of claim 50, wherein said programming instructions enable the apparatus to select a peak frame from a plurality of frames as the thermal image.

57. The apparatus of claim 50, wherein said programming instructions enable the apparatus to perform said determining by determining whether the sub-region's shape corresponds to a reference sub-region's shape in an expected way.

58. The apparatus of claim 57, wherein the region of interest is a secondary region of interest, and the reference sub-region is a sub-region within a primary region of interest.

59. The apparatus of claim 36, wherein said programming instructions further enable the apparatus to decide based at least in part on the results of said determining, whether the turbine component should be considered as having passed or failed the inspection.

60. An apparatus comprising:

at least one storage unit having stored therein a plurality of programming instructions designed to enable the apparatus to set a working pixel value to a predetermined pixel value, determine whether the number of pixels within a region of a frame having pixel values greater than the working pixel value substantially equate to a critical area size, the frame pictorially capturing thermal response of a turbine component to thermal stimuli applied to the turbine component, adjust the working pixel value to a next pixel value to cause the number of pixels within the region having pixel values greater than the working pixel value to equate closer to the critical area size, if the number of pixels within the region having pixel values greater than the working pixel value do not substantially equate to the critical area size, and repeat said determining of whether the number of pixels within the region having pixel values greater than the working pixel value substantially equate to the critical area size, and said adjusting, until the number of pixels within the region having pixel values greater than the working pixel value substantially equate to the critical area size; and at least one processor coupled to said at least one storage unit to execute said programming instructions.

61. The apparatus of claim 60, wherein said programming instructions further enable the apparatus to derive a temperature threshold in accordance with the working pixel value that yielded a quantity of pixels within the region with pixel values greater than the working pixel value, substantially equate to the critical area size.

62. The apparatus of claim 60, wherein said programming instructions further enable the apparatus to perform one or more weighted moment analyses based on the pixels within the region with pixel values greater than the terminating working pixel value.

63. The apparatus of claim 62, wherein said programming instructions enable the apparatus to perform each of the one or more weighted moment analyses by determining a weighted moment value, and determining whether the weighted moment value is within a corresponding moment value acceptance range.

64. The apparatus of claim 63, wherein the weighted moment value is a weighted moment value of a selected combination of moment orders of a first and a second direction.

65. The apparatus of claim 64, wherein the weighted moment orders are selected from a group comprising a zero order moment, a first order moment, a second order moment, and a third order moment.

66. The apparatus of claim 63, wherein the weighted moment value is a selected one of a centroid compensated weighted moment value, a normalized weighted moment value and an invariant weighted moment value.

67. An apparatus comprising:

at least one storage unit having stored therein a plurality of programming instructions designed to process a subset of pixels within a region of a frame pictorially capturing thermal response of a turbine component to thermal stimuli applied to the turbine component to compute a weighted moment value of a first moment order in a first direction and a second moment order in a second direction; and determine based at least in part on said weighted moment value, whether the subset of pixels substantially equate to a critical shape.

68. The apparatus of claim 67, wherein said moment orders are selected from a group comprising a zero moment order, a first moment order, a second moment order, and a third moment order.

69. The apparatus of claim 67, wherein said programming instructions enable the apparatus to perform said processing of the subset of pixels within the region a number of times to compute a plurality of weighted moment values;

compute one or more derivative moment values based on said computed weighted moment values; and further basing said determination on said one or more derivative moment values.

70. The apparatus of claim 69, wherein said one or more derivative moment values are one or more of a centroid compensated moment value, a normalized moment value, and an invariant moment value.

* * * * *